(12) United States Patent
Kutliroff et al.

(10) Patent No.: US 7,970,176 B2
(45) Date of Patent: Jun. 28, 2011

(54) METHOD AND SYSTEM FOR GESTURE CLASSIFICATION

(75) Inventors: Gershom Kutliroff, Alon Shrut (IL); Amit Bleiweiss, Alon Shrut (IL)

(73) Assignee: Omek Interactive, Inc., Bet Shemesh (IL)

( * ) Notice: Subject to any disclaimer, the term of this patent is extended or adjusted under 35 U.S.C. 154(b) by 938 days.

(21) Appl. No.: 11/866,280

(22) Filed: Oct. 2, 2007

(65) Prior Publication Data
US 2009/0085864 A1  Apr. 2, 2009

(51) Int. Cl.
*G06K 9/00* (2006.01)
*G06F 3/048* (2006.01)

(52) U.S. Cl. .................. 382/103; 382/291; 715/863

(58) Field of Classification Search .......... 382/100, 382/103, 107, 155, 162, 168, 173, 181, 189, 382/199, 203, 209, 224, 232, 254, 274, 276, 382/287–291, 305, 312; 345/853; 359/630; 482/8; 709/206; 715/863
See application file for complete search history.

(56) References Cited

U.S. PATENT DOCUMENTS

| | | | |
|---|---|---|---|
| 5,534,917 A | 7/1996 | MacDougall | |
| 6,788,809 B1 * | 9/2004 | Grzeszczuk et al. | 382/154 |
| 7,038,855 B2 * | 5/2006 | French et al. | 359/630 |
| 7,340,077 B2 * | 3/2008 | Gokturk et al. | 382/103 |
| 7,372,977 B2 * | 5/2008 | Fujimura et al. | 382/103 |
| 7,725,547 B2 * | 5/2010 | Albertson et al. | 709/206 |
| 2003/0156756 A1 | 8/2003 | Gokturk et al. | |
| 2004/0001113 A1 * | 1/2004 | Zipperer et al. | 345/853 |
| 2008/0244465 A1 * | 10/2008 | Kongqiao et al. | 715/863 |
| 2009/0298650 A1 * | 12/2009 | Kutliroff | 482/8 |
| 2010/0034457 A1 | 2/2010 | Berliner et al. | |

FOREIGN PATENT DOCUMENTS

| | | |
|---|---|---|
| JP | 2007316882 | 12/2007 |
| KR | 1020060070280 | 6/2006 |

OTHER PUBLICATIONS

Co-pending U.S. Appl. No. 12/392,879, filed Feb. 25, 2009.
Co-pending U.S. Appl. No. 12/707,340, filed Feb. 17, 2010.
Co-pending U.S. Appl. No. 12/817,102, filed Jun. 16, 2010.
International Search Report PCT/US2010/023179 dated Sep. 16, 2010, pp. 1-3.
Written Opinion PCT/US2010/023179 dated Sep. 16, 2010, pp. 1-4.
Y. Zhu, B., Dariush, K., Fujimura, "Controlled Human Pose Estimation from Dept H Image Streams" IEEE Computer Society Conference on Computer Vision and Pattern Recognition Workshops (CVPRW 08), pp. 1-8, Jun. 23-28, 2008. See abstract: Sections 2, 3, and 5: figure 1.

(Continued)

*Primary Examiner* — Seyed Azarian
(74) *Attorney, Agent, or Firm* — Perkins Coie LLP (57) ABSTRACT

The present invention is a method of identifying a user's gestures for use in an interactive game application. Video-camera images of the user are obtained, and feature point locations of a user's body are identified in the images. A similarity measure is used to compare the feature point locations in the images with a library of gestures. The gesture in the library corresponding to the largest calculated similarity measure which is greater than a threshold value of the gesture is identified as the user's gesture. The identified gesture may be integrated into the user's movements within a virtual gaming environment, and visual feedback is provided to the user.

30 Claims, 6 Drawing Sheets

OTHER PUBLICATIONS

C. Keskin, et al., Real Time Hand Tracking and 3D Gesture Recognition for Interactive Interfaces Using HMM, Computer Engineering Dept. Bogazici University, pp. 1-4.

Jakub Segen, et al., Fast and Accurate 3D Gesture Recognition Interface, Bell Laboratories, Holmdel, NJ 07733, 6 pages.

Vladimir I. Pavlovic, et al., Visusal Interpretation of Hand Gestures for Human-Computer Interaction: A Review, Department of Electrical and Computer Engineering, and The Beckman Institute for Advanced Science and Technology University of Illinois at Urbana-Champaign, 36 pages.

* cited by examiner

METHOD AND SYSTEM FOR GESTURE CLASSIFICATION

FIELD OF THE INVENTION

The present invention relates generally to video processing of images. More specifically, the present invention processes data obtained from motion capture equipment to detect and classify movements made by a user as a particular gesture.

BACKGROUND OF THE INVENTION

Interactive computer gaming has become extremely popular. For example, Sony's EyeToy® was the first mass-market application to enable a user to control a game through the use of a camera which captured the user's physical movements. Nintendo's Wii™ included controllers that detected the movements of a user's hands during game play through the use of accelerometers and infrared detection.

In general, the data obtained by these hardware devices is noisy, and it is difficult to interpret a user's movements based only on the raw data as input. Many image processing techniques have been developed to take frames generated by a camera and interpret them, but the tracking of a user's body movements with these techniques has met with only limited success. In addition, the nature of the data can be insufficient when parts of the user's body block the line of sight to the camera of other parts of the user's body.

Gesture detection systems exist which use a start and end point to define the time span of a gesture, and the positional data acquired between the start and end points are compared with a set of known gestures. However, the disadvantage to this type of system is that the beginning and end points of the gesture must be known before attempting to classify the gesture.

SUMMARY OF THE INVENTION

Identification of a movement made by a user as a particular gesture can be done by looking specifically for the gesture to be identified rather than tracking the different components of the user's body. Thus, rather than asking the question, "For each frame in a sequence, what are the positions of each of the joints?" the question to be answered is "Did the user make a specific gesture or not?" The second question is a yes or no question and is easier to answer than the first question. Identifying a gesture depends not only on the positions of certain feature points of interest on a user's body but also on the timing of the movements of the feature points of interest over several frames.

First, baseline data is generated during a pre-processing step by recording multiple subjects performing the gestures to be identified multiple times. Color and depth images are taken by a camera of the moving subject. The relative locations of several feature points of interest on the subjects' bodies are tracked in the sequence of recorded images. The movements of the subjects are averaged over the multiple times the gesture is performed by one subject and also over the different subjects. Averaging is used in order to prevent overfitting the baseline data to a single gesture made by one person. The averaged baseline data for each gesture is then stored in a gesture library.

The recorded movements of a user are compared to the gestures stored in the library by using a similarity measure which calculates how similar two gesture data sets are to each other. If the similarity measure for a user's movements as compared to a particular gesture in the library are higher than a threshold value associated with that gesture, it is likely that the user's movements have been identified as that gesture. The similarity measure is a function of the baseline data, the data of the user's movements, a weighting function dependent upon time, and a weighting function dependent upon the feature points of interest.

DETAILED DESCRIPTION OF THE INVENTION

Figure 1:
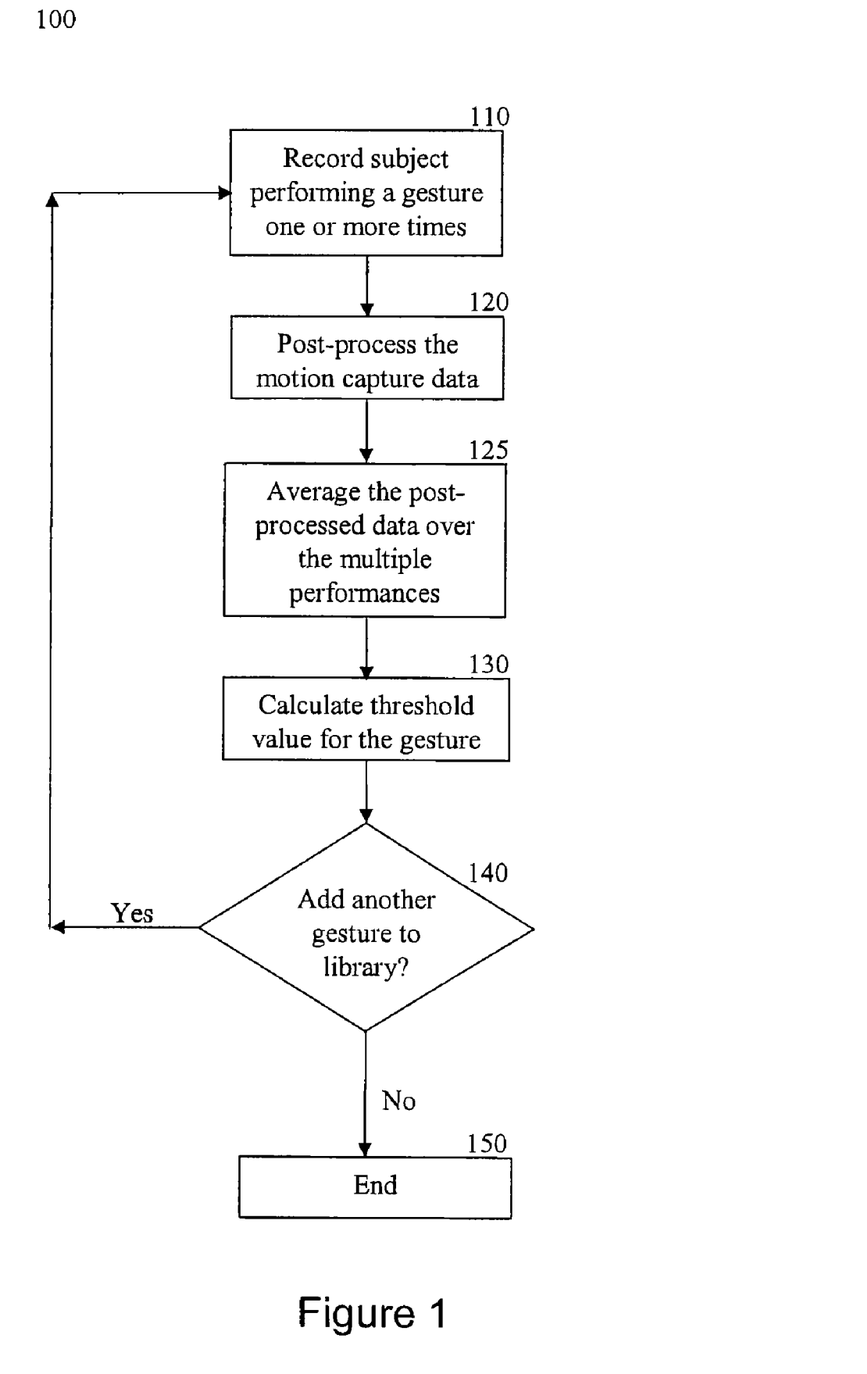
FIG. 1 is a flow chart illustrating a method of creating a library of gestures using motion capture equipment.

In order to classify a user's movements as a particular gesture, the user's movements are compared to a known set of gestures catalogued and stored in a gesture library. For each gesture in the library, baseline or "ground truth" data is first generated in a pre-processing step for each gesture. The "ground truth" data is then used as a baseline against which a user's movements are compared in order to classify the movements as a particular gesture. Data characterizing the relative positions of the feature points of interest over several images in a sequence are used for the comparison. FIG. 1 shows one method 100 by which "ground truth" data may be obtained for the gesture library.

In step 110, at least one subject is recorded performing a gesture of interest multiple times. A sensor is placed on each feature point of interest on the subject's body, and motion capture equipment is used to record the subject's movements in a sequence of images. Feature points of interest may include joints and locations corresponding to, for example, the subject's left hand, left elbow, left shoulder, or head. It will be apparent to a person skilled in the art that many other locations on a subject's body may also be feature points of interest. The output of step 110 is a set of three-dimensional points with each point corresponding to one feature point in each image in the sequence.

In step 120, the data from the motion capture sessions are post-processed by manually cleaning and smoothing the data using standard techniques for processing motion capture data. It will be apparent to a person skilled in the art that other post-processing steps may also be performed. The data is then averaged in step 125 over the multiple times that the gesture is performed in order to minimize bias. In a preferred embodiment, many different subjects are recorded performing the gesture, and the gestures of the different subjects are averaged to prevent overfitting the ground truth data to one person.

A similarity measure is a function that quantitatively compares the similarity of two gesture sets with each other. The higher the similarity measure value, the more similar a person's movements are to a known gesture that the movements are being compared to. In step 130, a threshold value is calculated for the gesture such that if a similarity measure comparing the gesture to a person's movements is greater than a threshold value for that particular gesture, it is likely that the person's movements have been identified as that gesture.

Step 140 queries whether another gesture is to be added to the gesture library. If so, the above steps are repeated beginning at step 110 with the recording of at least one subject performing the new gesture. If no further gestures are to be added to the library, then the gesture library is complete.

Figure 2:
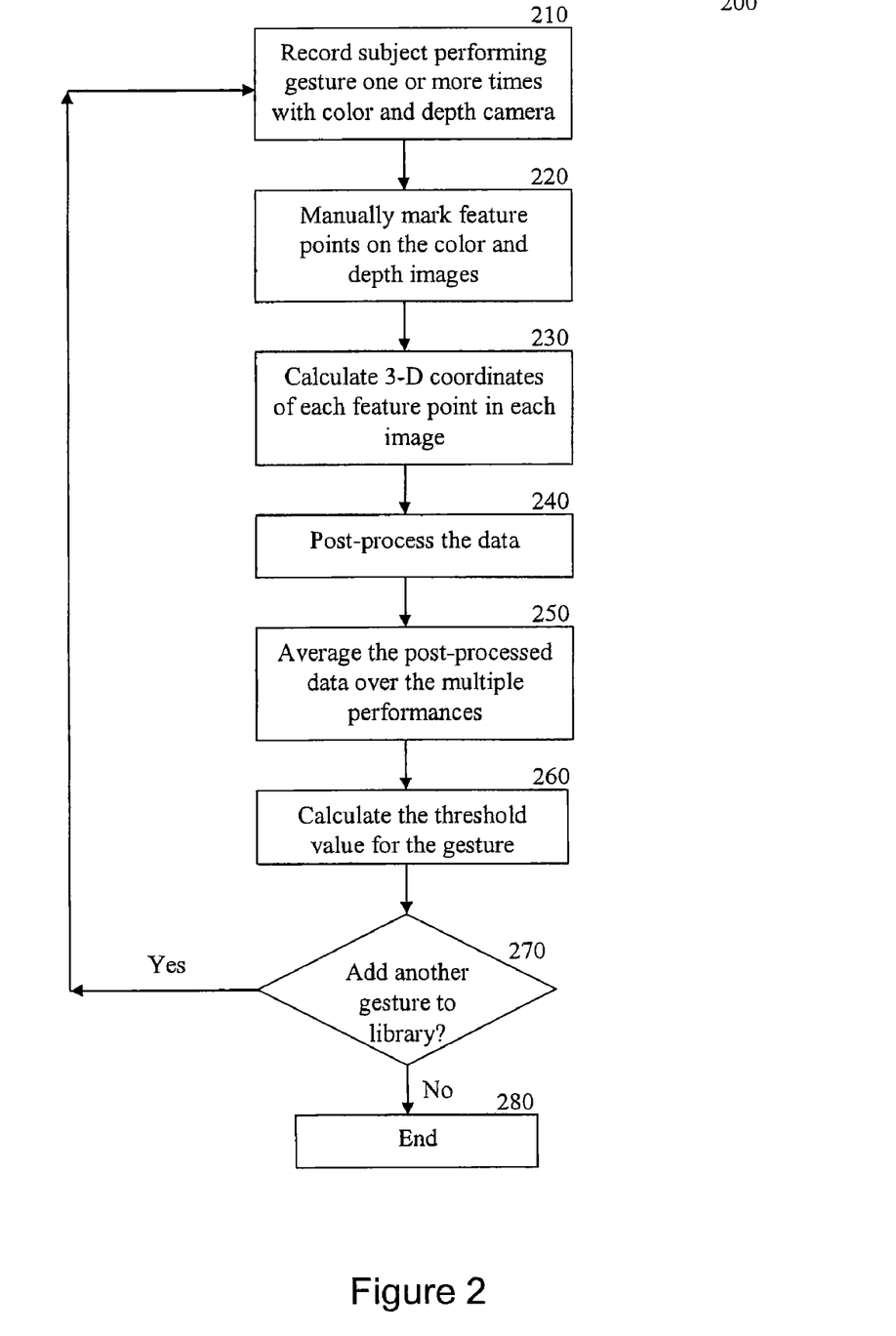
FIG. 2 is a flow chart illustrating a method of creating a library of gestures using color and depth images.

FIG. 2 shows an alternative method 200 by which "ground truth" data for a gesture and its corresponding gesture threshold value may be obtained for a gesture library. In step 210, a videocamera capable of recording color and depth images is used to record at least one subject performing a gesture of interest several times. In step 220, the positions of the feature points of interest are manually marked on the sequences of color and depth images. In stage 230, three-dimensional coordinates of each feature point of interest are calculated for each color-depth pair of images in the sequence of images capturing the gesture. Post-processing of the data occurs in step 240. Post-processing steps that may be performed include smoothing the data temporally and spatially. It will be apparent to a person skilled in the art that other post-processing steps may also be performed.

The data is then averaged in step 250 over the multiple times that the gesture is performed in order to minimize bias. In a preferred embodiment, many different subjects are recorded performing the gesture, and the gestures of the different subjects are averaged to prevent overfitting the ground truth data to one person.

In step 260, a threshold value is calculated for the gesture such that if a similarity measure comparing the gesture to a person's movements is greater than a threshold value for that particular gesture, it is likely that the person's movements have been identified as that gesture.

Step 270 queries whether another gesture is to be added to the gesture library. If so, the above steps are repeated beginning at step 210 with the recording of at least one subject performing a new gesture. If no further gestures are to be added to the library, then the gesture library is complete.

Figure 3:
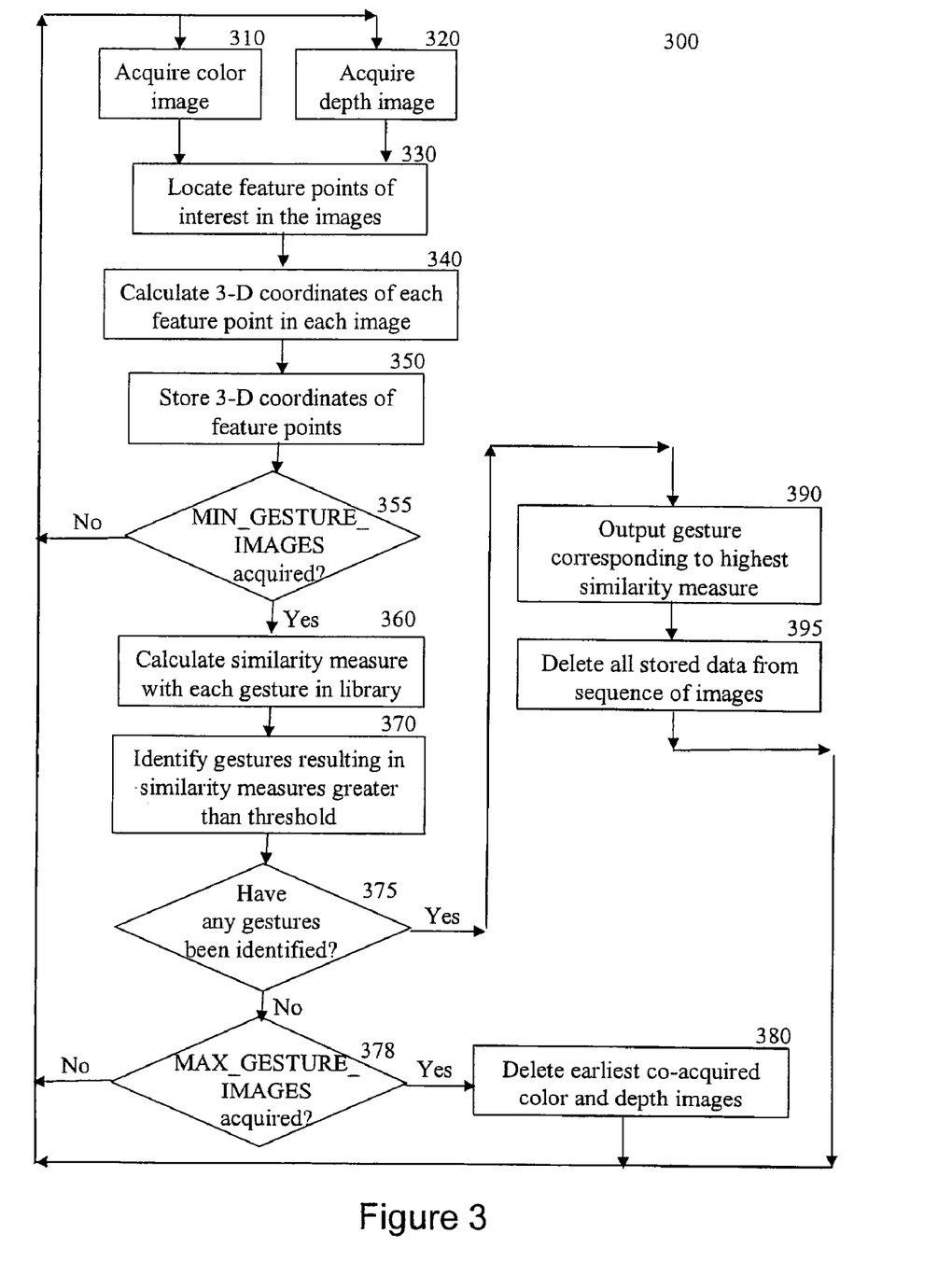
FIG. 3 is a flow chart illustrating a method of identifying a gesture from movements capture in a sequence of images.

FIG. 3 is a flow chart illustrating an example of a method 300 of identifying a user's movements as particular gestures according to a preferred embodiment of the present invention. In step 310, a color image of the user is acquired, and in step 320 a depth image of the user is acquired. Steps 310 and 320 are performed simultaneously by a camera with two lenses, one for acquiring color images and one for acquiring depth images. A color image is a digital representation of an image which contains multiple channels, and each channel corresponds to a different color. A preferred embodiment of the present invention uses three channels, and each channel corresponds to one of the colors red, green, and blue. However, any other suitable number of colors and color selection may be assigned to the multiple channels. Each channel is composed of an identical number of pixels, and each pixel has an intensity value between 0 and a maximum number. The maximum number is 255 in the preferred embodiment but may be larger or smaller depending upon the application of the images. The value of each pixel corresponds to the contribution of that color channel at each pixel's location.

A depth image contains a single channel composed of the same number of pixels as each color channel. The value of each pixel in a depth image corresponds to the distance between the camera lens and the user at each corresponding pixel's location. Different technologies may be used for generating depth images, including time of flight and triangulation. It will be apparent to a person skilled in the art that other technologies may be used for generating the images. The color images and the depth images may be analyzed and processed independently.

Typically, gestures occur over some span of time. Because it is not known when a user will begin to make any given gesture, images are taken sequentially of the user, and multiple images over a span of time are recorded for analysis. The multiple images each include a color and depth image as discussed above. The following steps apply to each of the multiple images in the sequence.

The color and depth images acquired in steps 310 and 320 are used to locate feature points of interest on the user's body in step 330. Feature points of interest may include joints and locations corresponding to, for example, the user's left hand, left elbow, left shoulder, or head. It will be apparent to a person skilled in the art that many other locations on a user's body may also be feature points of interest. The present invention is intended to be able to identify gestures made by any part or parts of a user's body.

In the step 340, three-dimensional coordinates for each one of the feature points of interest are computed from the color and depth images. The coordinate locations for each of the feature points of interest are stored in step 350 for the frame corresponding to the co-acquired color and depth images.

Classification of a user's recorded movements is accomplished by comparing the movements with each of the gestures stored in a gesture library. Each gesture in the library consists of a sequence of images covering the period of time required to perform the gesture, with a uniform time lapse occurring between images in the sequence. Each gesture is associated with a minimum number of sequential images sufficient to capture the entire movement of the gesture. Thus, a quick gesture like a finger snap requires fewer sequential images, while a gesture that takes a longer time to perform, for example, a handshake, requires more sequential images. Let the gesture in the library which takes the shortest period of time to perform be captured by a number of sequential images called MIN_GESTURE_IMAGES. Let the gesture in the library which takes the longest period of time to perform be captured by a number of sequential images called MAX_GESTURE_IMAGES. Thus, capturing MAX_GESTURE_IMAGES sequential images will be sufficient to capture any gesture in the library.

At decision point 355, if MIN_GESTURE_IMAGES sequential images have not been acquired and stored, the process returns to steps 310 and 320 where another set of color and depth images is co-acquired and appended to the sequence of images being analyzed. If at least MIN_GESTURE_IMAGES sequential images have been stored for analysis, step 360 makes a quantitative comparison of the user's movements with each gesture in the library requiring no more than the number of currently stored images. For example, if gesture A requires eight images to capture, gesture B requires nine images to capture, and gesture C requires ten images to capture, and there are currently nine stored images, a comparison of the eight most recently acquired images will be made with gesture A, while a comparison of all nine images will be made with gesture B. Gesture C will not be used for a comparison at this point in the algorithm because not enough images have been acquired yet.

The quantitative comparison is made through the use of a similarity measure. A similarity measure calculates how similar two gesture data sets are to each other; the higher the similarity measure value is, the more similar the two gesture data sets are. A sample similarity measures is described in more detail below. Thus, in step 360, a set of similarity measure values are obtained by comparing the user's movements to each gesture in the library requiring no more than the number of currently stored images.

Then in step 370, each of the similarity measure values in the set are compared to the threshold value for the particular gesture which was used to obtain the similarity measure value. Gestures which result in a similarity measure value greater than the gesture's pre-calculated threshold value, if any, are identified and passed to decision point 375.

At decision point 375, if at least one gesture has been identified which produced a similarity measure value greater than the corresponding threshold value, the gesture in the library which produced the highest similarity measure value is identified as the gesture that the user made and is output at step 390. Then in step 395, the sequence of images acquired in steps 310 and 320 is deleted, and the process subsequently returns to steps 310 and 320 to obtain a new set of color and depth images to identify the next movements made by the user.

At decision point 375, if no gestures were identified which produced a similarity measure value greater than the corresponding threshold value, then no known gesture was detected in the time period spanned by the sequential images co-acquired in steps 310 and 320 and used to calculate the similarity measure values in step 360. The process flows to decision point 378 where it is determined whether MAX_GESTURE_IMAGES sequential images have been acquired. If the number of images that have been stored is less than MAX_GESTURE_IMAGES sequential images, the process returns to steps 310 and 320 where another set of color and depth images of the user is co-acquired and appended to the sequence of images for analysis.

If at decision point 378 the MAX_GESTURE_IMAGES sequential images have already been acquired and analyzed, the earliest co-acquired color and depth images in the sequence of images stored for analysis are deleted. Then the process returns to steps 310 and 320 where another set of color and depth images of the user is co-acquired and appended to the sequence of images for analysis.

Figure 4:
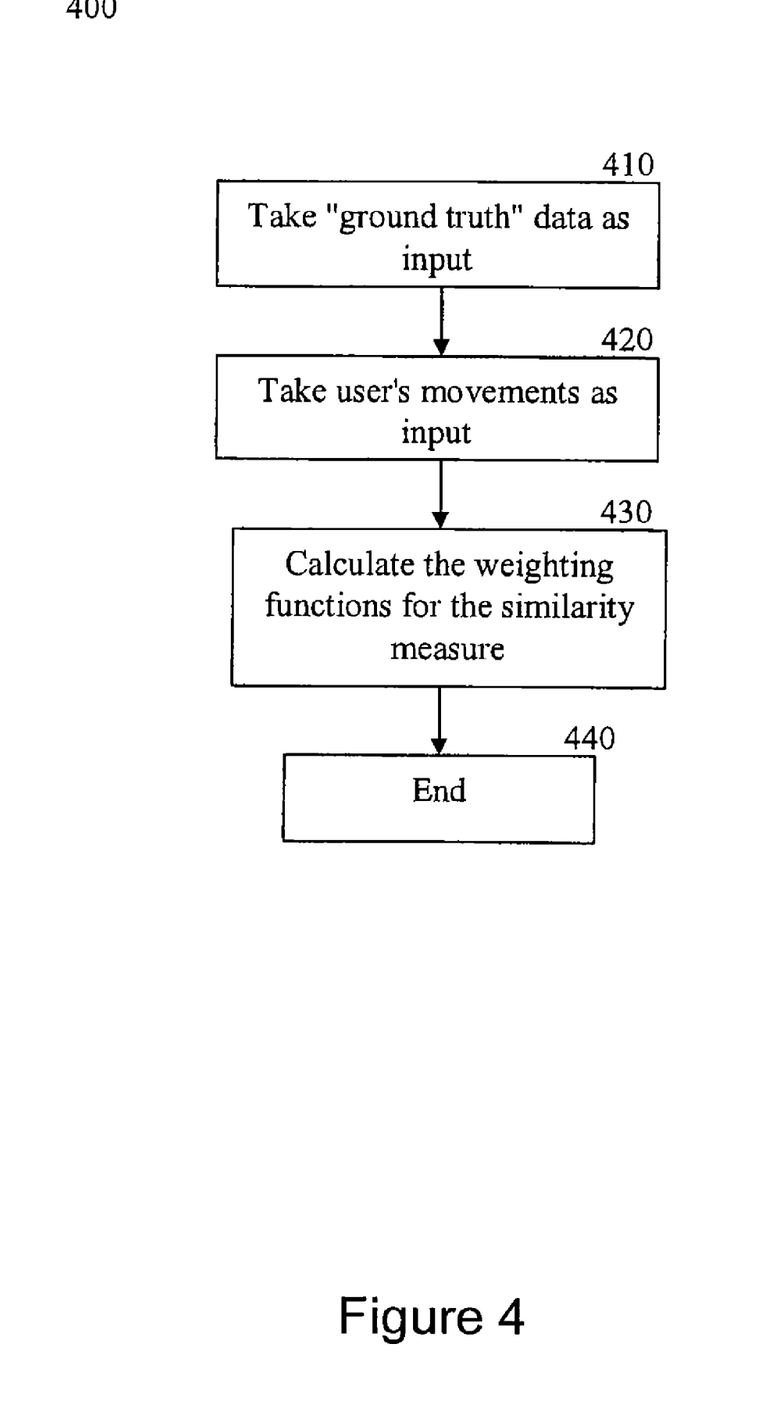
FIG. 4 is a flow chart illustrating a method of calculating a similarity measure for use in classifying gestures.

The flow chart in FIG. 4 illustrates a method 400 of calculating a similarity measure for use in differentiating and classifying gestures. The similarity measure is a function of the "ground truth" data for a known gesture, a weighting function dependent upon time, a weighting function dependent upon the feature points of interest, and the positional data acquired of a user's movements over a period of time.

In step 410, the "ground truth" data for each gesture in the gesture library is taken as an input for calculating the similarity measure. The "ground truth" data is represented as $x(i,j)$, where the variable i takes on the values $\{1, 2, \ldots m\}$ and refers to the feature points of interest, and the variable j takes on the values $\{1, 2, \ldots n\}$ and refers to the relative time in the gesture sequence for which the "ground data" is applicable.

In step 420, the user's movements acquired with the color and depth camera are taken as another input for calculating the similarity measure value. The user's movements are represented as $y(i,j)$, where the variable i takes on the values $\{1, 2, \ldots m\}$ and refers to feature points of interest on a user's body, and the variable j takes on the values $\{1, 2, \ldots n\}$ and refers to the relative time in the sequence of images of the user's movements.

One sample similarity measure that may be used for classifying movements as gestures is:

$$S_{u,w}(\vec{x}, \vec{y}) = \sum_{j=1}^{n} u(j) \sum_{i=1}^{m} w(i)|x(i,j) - y(i,j)|,$$

where $u(j)$ is a function of time and $w(i)$ is a function of the feature points of interest. Then let:

$$S_{u,w}(x,y) = \begin{cases} \hat{S}_{u,w}(x,y) & \text{when } x \text{ is the gesture described by } y, \text{ and} \\ \tilde{S}_{u,w}(x,y) & \text{when } x \text{ is NOT the gesture described by } y \end{cases}.$$

In step 430, the weighting functions $u(j)$ and $w(i)$ must be determined over the entire set of x and y such that the value of the function $\hat{S}_{u,w}(x, y)$ is minimized, and the value of the function $\tilde{S}_{u,w}(x, y)$ is maximized.

The process of determining the weighting functions for the similarity measures can, in general, be done offline, prior to the time when the classification of gestures needs to be made. Thus, a memory-intensive and computation-intensive algorithm may be used to calculate the values of $\hat{S}_{u,w}(x, y)$ and $\tilde{S}_{u,w}(x, y)$ for all of the possible weighting functions and to choose the optimal values for the weighting functions to satisfy the above requirements for $S_{u,w}(x,y)$. After obtaining the optimal weighting functions, the similarity measure threshold values may then be calculated for each gesture in the gesture library. It will be apparent to a person skilled in the art that other similarity measure functions may be used which use the same weighting functions in a different manner, use other types of weighting functions, or uses the "ground truth" data and the data acquired from the user's movements in a different manner.

Gesture recognition software has many applications such as interactive gaming, sports, or fitness programs. Gaming programs may include adventure scenarios, quests, race-courses, battle scenarios, and rescue missions. Sports programs may include baseball, football, tennis, soccer, martial arts. Fitness programs may include yoga, tai chi, martial arts, and racing. All of these interactive programs can more easily engage users when the user's movements are displayed on a screen, providing direct visual feedback to the user in real-time. In particular, exergaming, an activity where exercise or a fitness program is combined with gameplay, can offer a fully interactive and immersive experience when accurate gesture recognition software identifies a user's movements and incorporates the user's movements into the flow of action displayed upon a screen.

Figure 5:
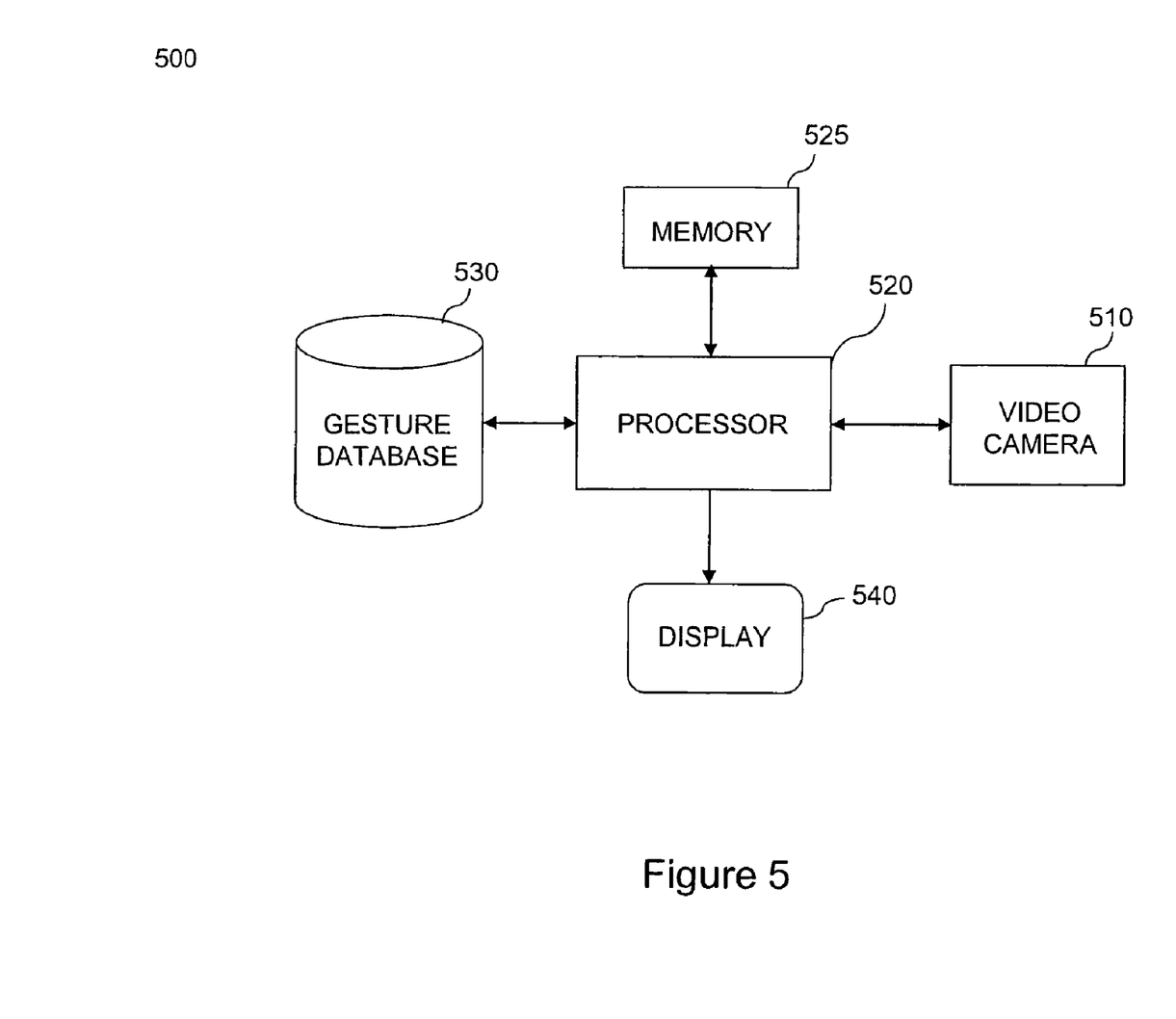
FIG. 5 is a diagram of one embodiment of the gesture classification system of the present invention.

FIG. 5 is a diagram 500 of one embodiment of the gesture classification system incorporated into an interactive program. The video camera equipment 510 is used to capture a user's movements. The video camera equipment 510 takes simultaneous color and depth images of the user, and the images are sent to the processor 520 for processing.

The processor 520 locates feature points of interest in the color and depth images, calculates three-dimensional coordinates for each feature point in the co-acquired color and depth images, stores the coordinates in memory 525 for processing, ensures the minimum number of images have been acquired, calculates similarity measures by comparing the movements with each gesture in the database 530, identifies gestures that result in similarity measures greater than the threshold value for the gesture that the movements have been compared with, identifies the highest similarity measure obtained, prompts the video camera equipment 510 to acquire additional images, controls the memory 525 to delete processed images, and outputs identified gestures to the display 540, thus providing feedback to the user. The processor 520 also runs the interactive program which the user experiences virtually through the display 540.

The display 540 presents an image of the user performing the gesture identified by the processor 520. The image of the user is incorporated into the virtual environment of the interactive program which is also presented by display 540.

The key to truly interactive exergaming is providing the user with accurate visual feedback as to the user's movements and the effects of the user's movements upon a virtual environment. During the exergaming program, a player receives real-time feedback and encouragement on his or her progress, while the visual and audio cues of the game prompt the player to do more, work harder, and reach personal milestones.

Players may also interact and socialize with other members of an exergaming network while participating in the exergame. An exergaming network enables multiple players to interact within the same virtual environment. Each player may participate from a different location or in the same room with other participants; the physical location of each player is immaterial with the exergaming network. Each player's movements are captured and stored using video camera equipment. The exergaming network then identifies the movements made by each participant and incorporates the movements of the multiple players into one virtual environment. The same virtual environment is then broadcast to each location in which an exergaming participant is located. Thus, an exergaming network can turn an ordinary fitness routine into an interactive gaming experience.

Figure 6:
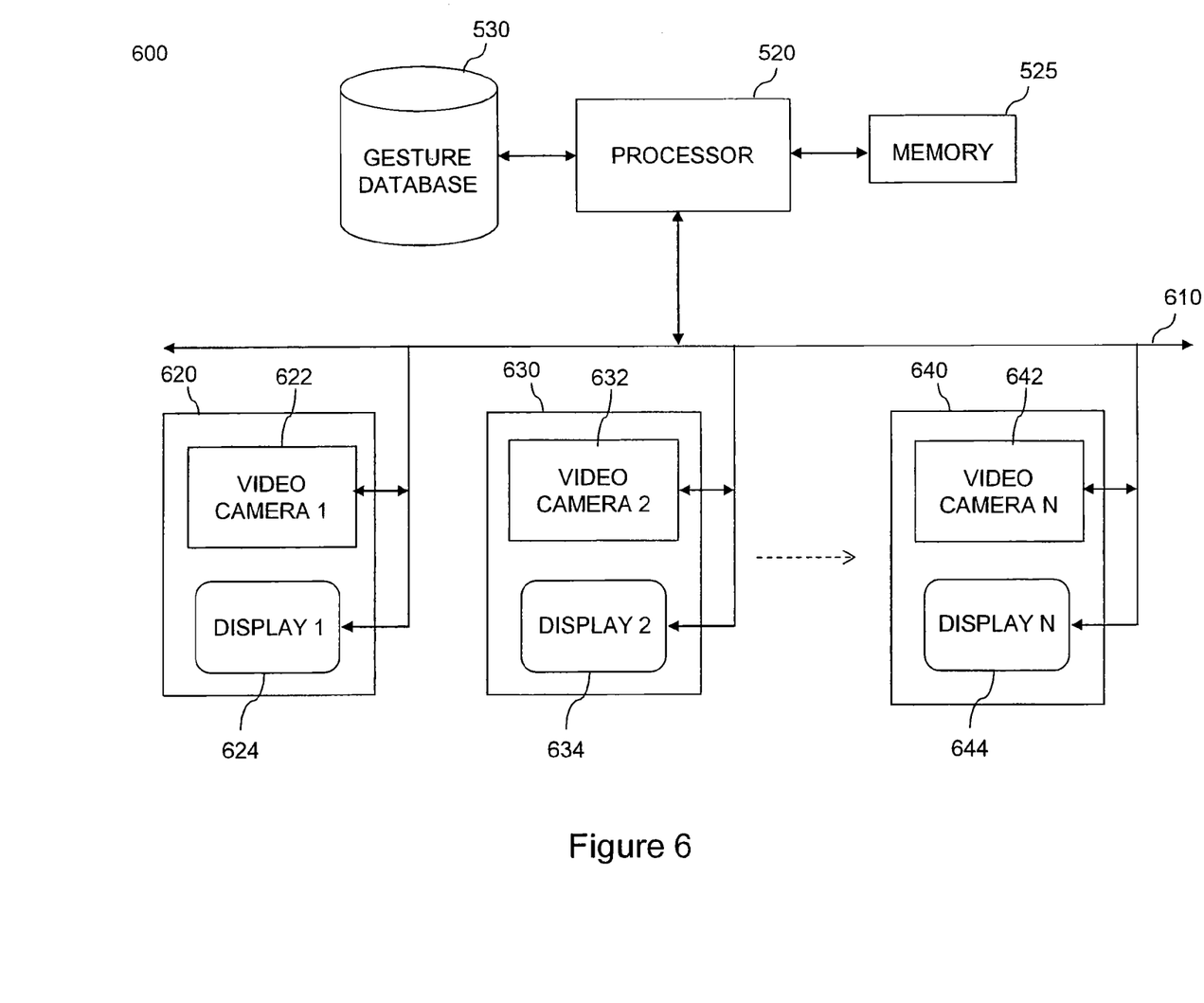
FIG. 6 is a diagram of another embodiment of the gesture classification system of the present invention.

FIG. 6 is a diagram 600 of one embodiment of the gesture classification system incorporated into an interactive program accessed by multiple players over a network. Multiple players may access the same interactive program from different locations. FIG. 6 shows three separate sites 620, 630, and 640 from which users access the same virtual environment, but any number of users from any number of sites may participate in the interactive program. Each site 620, 630, and 640 has video camera equipment 622, 632, and 642 which take simultaneous color and depth images of a user at that location, and the images are sent to the processor 520 for processing. If more than one user is at the same site, video camera equipment dedicated to each user at the site should be available. All the users at the same site may share a display 624, 634, and 644 or have their own individual displays. However, all the displays are capable of showing images of all the users at the different sites participating in the same virtual environment.

The images obtained by the video camera equipment 622, 632, and 642 from the different sites 620, 630, and 640 are sent over a network 610 to the processor 520. The processor 520, memory 525, and gesture database 530 function in the same manner as described above, but with multiple users participating in the same interactive program, the processor 520 must process the images captured for each user. Alternatively, the processor 520 may have sub-processors dedicated to individual users, and each sub-processor may access an independent memory within the memory 525. It will be apparent to a person skilled in the art that different hardware structures may implement the functions of the processor 520 and the memory 525 to optimize the response time.

The processor 520 also runs the interactive program which the users are experiencing virtually through the displays 624, 634, and 644. The images of all the users are incorporated into the virtual environment of the interactive program which is presented by each display 624, 634, and 644. Signals are sent by the processor 520 to the displays 624, 634, and 644 along the network 610.

What is claimed is:

1. A method of classifying gestures comprising:
   acquiring a first plurality of images of a subject;
   identifying a first set of feature points in the first plurality of images;
   calculating one or more similarity measures, wherein the one or more similarity measures quantify a similarity of the first set of feature points in the first plurality of images to one or more second sets of feature points of one or more catalogued gestures captured in one or more second plurality of images;
   using one or more threshold values for the one or more similarity measures associated with the one or more catalogued gestures to determine if the subject made the one or more catalogued gestures; and
   selecting an identified gesture as the one or more catalogued gestures resulting in a largest similarity measure.

2. The method as claimed in claim 1, wherein the first plurality of images comprises a plurality of depth images and a plurality of color images.

3. The method as claimed in claim 2, wherein each of the plurality of color images comprises three channels, and each channel corresponds to a different color.

4. The method as claimed in claim 1, wherein the first set of feature points are points on the subject's body such as joints.

5. The method as claimed in claim 1, wherein the one or more second plurality of images is created by recording multiple series of exemplary images of one or more users performing the one or more catalogued gesture multiple times and averaging over the multiple series of exemplary images for each of the one or more catalogued gestures.

6. The method as claimed in claim 5, wherein a sensor is placed on each feature point on the one or more users while recording the multiple series of exemplary images, and the multiple series of exemplary images are post-processed before averaging over the multiple series of exemplary images for each of the one or more catalogued gestures.

7. The method as claimed in claim 5, wherein each exemplary image includes a depth image and a color image, and a three-dimensional coordinate is calculated for each feature point and smoothed temporally and spatially before averaging over the multiple series of exemplary images for each of the one or more catalogued gestures.

8. The method as claimed in claim 1, wherein the similarity measure is calculated using a feature-point-dependent weighting function and a time-dependent weighting function.

9. A system for classifying gestures comprising:
   a sensor for acquiring a first plurality of images of a subject;
   a database of known gestures; and
   a processor for identifying a first set of feature points in the first plurality of images; calculating a similarity measure, wherein the similarity measure quantifies a similarity of the first set of feature points in the first plurality of images to a second set of feature points of a known gesture captured in a second plurality of images, wherein the second plurality of images is created by recording multiple series of exemplary images of one or more users performing the known gesture multiple times and averaging over the multiple series of exemplary images; and using a threshold value of the similarity measure associated with the known gesture to determine if the subject made the known gesture.

10. The system as claimed in claim 9, wherein the first plurality of images comprises a plurality of depth images and a plurality of color images.

11. The system as claimed in claim 10, wherein each of the plurality of color images comprises three channels, and each channel corresponds to a different color.

12. The system as claimed in claim 9, wherein a sensor is placed on each feature point on the one or more users while recording the multiple series of exemplary images, and the multiple series of exemplary images are post-processed before averaging over the multiple series of exemplary images.

13. The system as claimed in claim 9, wherein each exemplary image includes a depth image and a color image, and a three-dimensional coordinate is calculated for each feature point and smoothed temporally and spatially before averaging over the multiple series of exemplary images.

14. The system as claimed in claim 9, wherein the similarity measure is calculated using a feature-point-dependent weighting function and a time-dependent weighting function.

15. A method of allowing a player to interact with a virtual environment comprising:
- acquiring a first plurality of images of the player;
- identifying a first set of feature points in the first plurality of images;
- calculating one or more similarity measures, wherein the one or more similarity measures quantify a similarity of the first set of feature points in the first plurality of images to one or more second sets of feature points of one or more catalogued gestures captured in one or more second plurality of images;
- using one or more threshold values for the one or more similarity measures associated with the one or more catalogued gestures to determine if the player made the one or more catalogued gestures; and
- selecting an identified gesture as the one or more catalogued gestures resulting in a largest similarity measure;
- integrating and displaying a virtual image of the player making the identified gesture within the virtual environment.

16. The method as claimed in claim 15 wherein the virtual environment simulates a game.

17. The method as claimed in claim 15 wherein the virtual environment simulates a sport.

18. The method as claimed in claim 15 wherein the virtual environment simulates a fitness program.

19. A system for allowing a first player to interact with a second player in a virtual environment comprising:
- a first sensor for acquiring a first set of images of the first player making a first set of movements;
- a second sensor for acquiring a second set of images of the second player making a second set of movements;
- a database of catalogued gestures;
- a processor for using a similarity measure and the database to identify the first set of movements as a first known gesture and the second set of movements as a second known gesture;
- a first display and a second display, each displaying a virtual image of the first player making the first known gesture and the second player making the second known gesture within the virtual environment; and
- a network to provide a communications between the first sensor, the second sensor, the database, the processor, the first display, and the second display.

20. The system as claimed in claim 19 wherein the virtual environment simulates a game.

21. The system as claimed in claim 19 wherein the virtual environment simulates a sport.

22. The system as claimed in claim 19 wherein the virtual environment simulates a fitness program.

23. A computer memory storing gesture classifying instructions for execution by a computer processor, wherein the gesture classifying instructions comprise:
- acquiring a first plurality of images of a subject;
- identifying a first set of feature points in the first plurality of images;
- calculating one or more similarity measures, wherein the one or more similarity measures quantify a similarity of the first set of feature points in the first plurality of images to one or more second sets of feature points of one or more catalogued gestures captured in one or more second plurality of images;
- using one or more threshold values for the one or more similarity measures associated with the one or more catalogued gestures to determine if the subject made the one or more catalogued gestures; and
- selecting an identified gesture as the one or more catalogued gestures resulting in a largest similarity measure.

24. The computer memory as claimed in claim 23, wherein the first plurality of images comprises a plurality of depth images and a plurality of color images.

25. The computer memory as claimed in claim 24, wherein a sensor is placed on each feature point on the one or more users while recording the multiple series of exemplary images, and the multiple series of exemplary images are post-processed before averaging over the multiple series of exemplary images for each of the one or more catalogued gestures.

26. The computer memory as claimed in claim 25, wherein each exemplary image includes a depth image and a color image, and a three-dimensional coordinate is calculated for each feature point and smoothed temporally and spatially before averaging over the multiple series of exemplary images for each of the one or more catalogued gestures.

27. The computer memory as claimed in claim 23, wherein each of the plurality of color images comprises three channels, and each channel corresponds to a different color.

28. The computer memory as claimed in claim 23, wherein the first set of feature points are points on the subject's body such as joints.

29. The computer memory as claimed in claim 23, wherein the one or more second plurality of images is created by recording multiple series of exemplary images of one or more users performing the one or more catalogued gesture multiple times and averaging over the multiple series of exemplary images for each of the one or more catalogued gestures.

30. The method as claimed in claim 23, wherein the similarity measure is calculated using a feature-point-dependent weighting function and a time-dependent weighting function.

* * * * *